(12) United States Patent
Samuel et al.

(10) Patent No.: US 7,981,845 B2
(45) Date of Patent: Jul. 19, 2011

(54) PARTIALLY NEUTRALIZED POLYHYDROXY ACIDS FOR WELL TREATMENTS

(75) Inventors: Mathew M. Samuel, Sugar Land, TX (US); Balkrishna Gadiyar, Katy, TX (US); Sai Aung Zaw Min, Yangon (MM)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 12/541,311

(22) Filed: Aug. 14, 2009

(65) Prior Publication Data
US 2010/0056401 A1  Mar. 4, 2010

Related U.S. Application Data

(60) Provisional application No. 61/092,972, filed on Aug. 29, 2008.

(51) Int. Cl.
*C09K 8/60* (2006.01)
*E21B 43/16* (2006.01)

(52) U.S. Cl. ....... 507/260; 166/305.1; 175/65; 507/211; 507/219; 507/267

(58) Field of Classification Search .................. 507/260, 507/211, 219, 267; 166/305.1; 175/65
See application file for complete search history.

(56) References Cited

U.S. PATENT DOCUMENTS

| | | | | |
|---|---|---|---|---|
| 3,704,750 A | * | 12/1972 | Miles et al. | 166/279 |
| 4,508,629 A | * | 4/1985 | Borchardt | 507/213 |
| 4,716,964 A | | 1/1988 | Erbstoesser | |
| 4,848,467 A | | 7/1989 | Cantu et al. | |
| 4,957,165 A | | 9/1990 | Cantu et al. | |
| 4,982,791 A | * | 1/1991 | Hunt et al. | 166/299 |
| 7,021,383 B2 | | 4/2006 | Todd et al. | |
| 7,166,560 B2 | | 1/2007 | Still et al. | |
| 7,219,731 B2 | | 5/2007 | Sullivan et al. | |
| 7,265,079 B2 | | 9/2007 | Willberg et al. | |
| 2003/0060374 A1 | | 3/2003 | Cooke, Jr. | |

* cited by examiner

*Primary Examiner* — Timothy J. Kugel
(74) *Attorney, Agent, or Firm* — David G. Matthews; Rodney Warfford; Tim Curington

(57) ABSTRACT

This relates to a method and composition for forming and utilizing a fluid in the oilfield services industry including exposing a polyacid and/or polyacid derivative to a preparation method, introducing the prepared polyacid and/or polyacid derivative to a fluid to form a treatment fluid, and treating a subterranean formation and/or a wellbore with the treatment fluid, wherein the viscosity of the treatment fluid is not observably reduced by introducing the prepared polyacid and/or polyacid derivative to a treatment fluid. This also relates to a method and composition for use in the oil field services industry including a prepared polyacid and/or polyacid derivative, a fluid, and a viscosity control agent, wherein the viscosity of the composition is not observably lower than if the prepared polyacid and/or polyacid derivative were not present.

33 Claims, 2 Drawing Sheets

PARTIALLY NEUTRALIZED POLYHYDROXY ACIDS FOR WELL TREATMENTS

FIELD OF THE INVENTION

Embodiments of this invention relate to treatment fluids for use in the oil field services industry. More specifically, the fluids may be used to increase the fluid efficiency and cleanup of treatments to subterranean formations.

BACKGROUND OF THE INVENTION

The statements in this section merely provide background information related to the present disclosure and may not constitute prior art.

Traditional oil field services such as hydraulic fracturing subterranean formations are not commonly selected for use in high permeability formations (over 200 about md). The very high fluid loss characteristics of these formations limit the desirability of fracturing because fluid loss additives are typically not degradable and can result in serious damage to high permeability formations. Several degradable fluid loss additives are commercially available and these materials release free acid or precursors to the solution and destabilize the high pH treatment fluids.

Effective fluids to stimulate hydrocarbon production from high permeability subterranean formations are needed. Fluids with fluid loss additives that have a tailored degradation profile are especially desirable.

SUMMARY

Embodiments of the invention provide a method and composition for forming and utilizing a fluid in the oilfield services industry including exposing a crude polyacid and/or polyacid derivative to a preparation method, introducing the prepared polyacid and/or polyacid derivative to a fluid to form a treatment fluid, and treating a subterranean formation and/or a wellbore with the treatment fluid, wherein the viscosity of the treatment fluid is not observably reduced by introducing the prepared polyacid and/or polyacid derivative to a treatment fluid. Embodiments of the invention also provide a method and composition for a treatment fluid for use in the oil field services industry including a prepared polyacid and/or polyacid derivative, a fluid, and a viscosity control agent, wherein the viscosity of the composition is not observably lower than if the prepared polyacid and/or polyacid derivative were not present.

BRIEF DESCRIPTION OF THE FIGURES

For further understanding of some embodiments, and the advantages thereof, reference is now made to the following description taken in conjunction with the accompanying figures, in which.

DESCRIPTION

Figure 1:
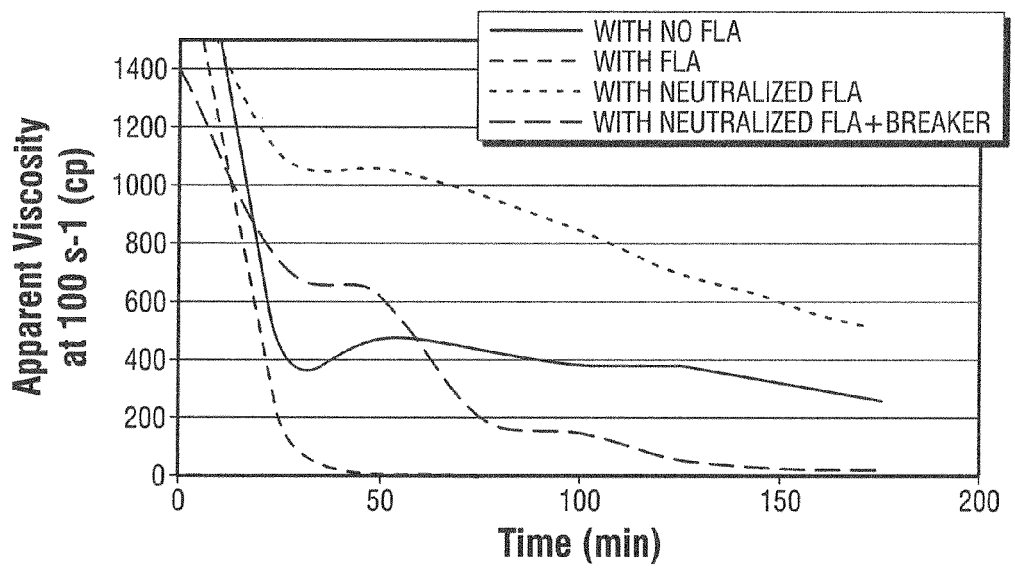
FIG. 1 is a plot of apparent viscosity as a function of time for four fluids of an embodiment of the invention with and without a fluid loss additive (FLA).

At the outset, it should be noted that in the development of any such actual embodiment, numerous implementation-specific decisions must be made to achieve the developer's specific goals, such as compliance with system related and business related constraints, which will vary from one implementation to another. Moreover, it will be appreciated that such a development effort might be complex and time consuming but would nevertheless be a routine undertaking for those of ordinary skill in the art having the benefit of this disclosure. In addition, the composition used/disclosed herein can also comprise some components other than those cited. In the summary of the invention and this detailed description, each numerical value should be read once as modified by the term "about" (unless already expressly so modified), and then read again as not so modified unless otherwise indicated in context. Also, in the summary of the invention and this detailed description, it should be understood that a concentration range listed or described as being useful, suitable, or the like, is intended that any and every concentration within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that inventors appreciate and understand that any and all data points within the range are to be considered to have been specified, and that inventors possessed knowledge of the entire range and all points within the range. The statements made herein merely provide background information related to the present disclosure and may not constitute prior art, or describe some embodiments illustrating the invention.

Polyacids and/or polyacid derivatives may be obtained for use in the well services industry in various grades, compositions, molecular weight, optical activity, refractive index, crystalline structure, and delivery forms such as powder, emulsions, fluids, concentrates, fibers, pellets, flakes. In any event, often the material is crude polyacid and/or polyacid derivative. That is, it may contain material with a variety of molecular weights, crystalline structure, impurities, or other variable physical or chemical properties that is not consistent with a desirable uniform polyacid and/or polyacid derivative structure. In some embodiments, the bulk polyacid and/or polyacid derivative has a maximum solubility of about 30 percent at ambient conditions.

Embodiments of the invention may include a variety of polyacids and/or polyacid derivatives. Examples include lactides; poly(lactides); lactones; glycolides; poly(glycolides); co-poly(glycolide); esters; ortho ethers; poly (ortho ethers); substantially water-insoluble anhydrides; poly(anhydrides); amino acids; amino acid polymers; nitro or sulfonate or carboxy or carboxyl acid functionally modified nanoparticles and/or nanopolymers; poly acrylic acid; aliphatic polyesters, poly(ε-caprolactones); poly(hydroxy ester ethers); poly(hydroxybutyrates); polycarbonates; poly(orthoesters); poly (ethylene oxides); poly(phosphazenes); poly(hydroxybutyrates); poly ether esters; polyester amides; polyamides; polycarboxy polymer; composites of poly acids with other natural or man-made (synthetic) materials; derivatives thereof, polymers thereof, copolymers thereof, and combinations thereof.

Polylactic acid (PLA), polyglycolic acid (PGA) and similar poly acids are selected for fluids for use in the oil field services industry, but the applications of the acids are often limited due to the dissolution of the poly acid in water (or alkaline solutions), which lowers the resulting solution pH. The rheology of viscoelastic fracturing fluids (VES fluids) is not seriously affected by lowering the pH. Thus, the use of a poly acid system in VES fluids is not often affected by these products due to its insensitivity of rheology over a wide range of pH. In contrast, borate and zirconate based crosslinked fracturing fluids require critical pH control for fluid stability. The addition of PLA/PGA or similar poly acids can lower the pH and make it unstable and thus limit the use of the poly acids in polymer based crosslinked fracturing fluids.

In any event, some embodiments include methods using poly acid in fracturing fluids as a fluid loss/cleanup additive without lowering the pH in the duration of pumping. When hydrolyzed, the acid is released into the solution and thus decreases the pH of the system. This can dramatically lower the stability of the crosslinked fluid while pumping and also at the downhole conditions. This can lead to undesirable early screenout of the proppant frac treatment.

Poly acids (PLA, PGA, PLA/PGA combinations, and others) are mixtures of acids of varying molecular weights and crystalline structure. The low molecular weight species can be hydrolyzed faster than the high molecular weight species. For example, as illustrated below, the crystalline structure of PLA may vary and solubility of the species highly depend on the crystalline structure of PLA or similar.

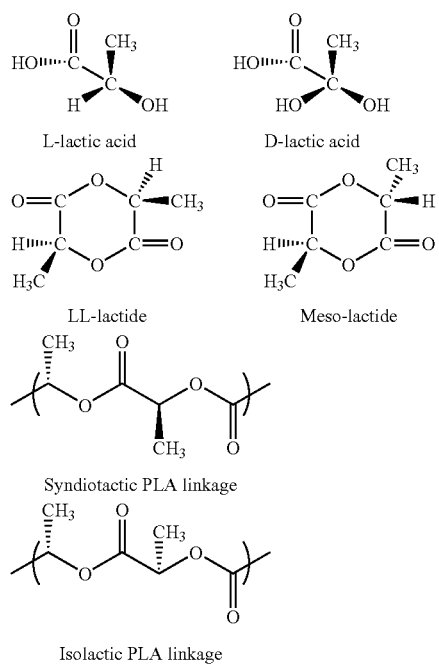

Chemical structure of poly(lactic acid) (PLA) and its constituent monomers (Palade et al., 2001).

Further, the isomers of the PLA molecule hydrolyze at different rates. D,L-PLA is always amorphous. Meso-lactide rarely occurs. The steroregular polymers levo-PLA and dextro are semicrystalline and occur most frequently. PLA compositions with more levo (L) isomers present have a lower solubility than PLA with more dextro (D) isomers. That is, if the concentration of D-PLA isomer in the polymer is greater than about 10 percent, the PLA is highly soluble. If the concentration of D-PLA is greater than about 7 percent the PLA is soluble.

Optical activity may be measured to indicate the presence of the specific isomers. The angle of deviation of a plane polarized light on contact with the material may be used to estimate the concentration of the specific isomers in the polymer.

To isolate the poly acid species containing predominantly the desirable isomer for the application as a fluid loss additive, three main approaches are selected. First, alkalinity may increased by introducing a basic solution such as sodium hydroxide or amine to the composition. Second, buffers may be used to tailor the pH of the composition. Third, a process step to wash the acid with water to remove low molecular weight species and the D-PLA isomers may be performed. One of the goals of exposing the polyacid and/or polyacid derivative to an isolation process is that the prepared polyacid and/or polyacid derivative is about 85 percent by weight or more of the polyacid and/or polyacid derivative in the treatment fluid or is about 90 percent by weight or more of the polyacid and/or polyacid derivative in the treatment fluid.

Several processes or chemicals may be selected to tailor the pH of the system for isolating the polymer with higher percentage of L-PLA. Before the material is introduced into a well treatment fluid, the PLA is treated with a solution of hydroxides (NaOH, KOH, $NH_4OH$), $Ca(OH)_2$, $Mg(OH)_2$, Carbonates ($Na_2CO_3$, $K_2CO_3$), bicarbonates ($NaHCO_3$, $KHCO_3$) and mixtures could also be used. Ammonia solution, or amine solutions (primary, secondary or tertiary) can also be used to wash or neutralize PLA/PGA. Ammonia derivatives (H—$NH_2$, R—$NH_2$, $(R)_2$—NH, $R_3$—N), Urea ($H_2N$—CO—$NH_2$) and/or thiourea ($H_2N$—CS—$NH_2$) could also be used.

In one embodiment, the generated free acid is removed using a sufficient quantity of a buffer (sodium bicarbonate-sodium carbonate mixture). In an example, a slurry of the poly acid in this buffer when added to treatment fluid did not lower the pH of the system in the duration of the treatment. Tailoring the pH may be especially desirable when introducing a polymer such as guar to a slurry because the crosslinked polymer may retain its structure as the pH is controlled.

Buffers that are selected to provide a pH of about 5 or higher may be desirable. In some embodiments, the pH may be about 5 to about 11. In many embodiments, buffers may be selected to provide a pH of above about 7. High pH buffers (organic and inorganic) can be used to remove the high soluble content in PLA or PGA. Examples include the following:

1. ($NH_4OH+NH_4Cl$)
2. ($C_2H_5$—$NH_2+C_2H_5NH_3+Cl$—)

The buffer may include a base and its salt with an acid. The buffer may include an amine and a halide; a weak acid and a salt; and/or an organic buffer. The buffer may include tris-glycine; sodium carbonate and sodium bicarbonate; potassium carbonate and potassium bicarbonate; phosphate and metaphosphate; $NH_4OH+NH_4Cl$; $C_2H_5$—$NH_2+C_2H_5NH_3+Cl$—; N-(2-Acetamido)-2-iminodiacetic acid; 2-[(2-Amino-2-oxoethyl)amino]ethanesulfonic acid; piperazine-N,N'-bis(2-ethanesulfonic acid); 3-(N-Morpholino)-2-hydroxypropanesulfonic acid; 1,3-Bis[tris(hydroxymethyl)methylamino]propane; N,N-Bis(2-hydroxyethyl)-2-aminoethanesulfonic acid; 3-(N-Morpholino)propanesulfonic acid; N-(2-Hydroxyethyl)piperazine-N'-(2-ethanesulfonic acid); N-Tris(hydroxymethyl)methyl-2-aminoethanesulfonic acid; 3-[N,N-Bis(2-hydroxyethyl)amino]-2-hydroxypropanesulfonic acid; 3-[N-Tris(hydroxymethyl)methylamino)-2-hydroxypropanesulfonic acid; Tris(hydroxymethyl)aminomethane; N-(2-hydroxyethyl)piperazine-N'-(2-hydroxypropanesulfonic acid); piperazine-N,N'-bis(2-hydroxypropanesulfonic acid); N-(2-Hydroxyethyl)piperazine-N'-(3-propanesulfonic acid); Triethanolamine; N-Tris(hydroxymethyl)methylglycine;

N,N-Bis(2-hydroxyethyl)glycine; N-Tris(hydroxymethyl) methyl-3-aminopropanesulfonic acid; 3-[(1,1-Dimethyl-2-hydroxyethyl)amino]-2-hydroxypropanesulfonic acid; 2-(N-Cyclohexylamino)ethanesulfonic acid; 3-(Cyclohexylamino)-2-hydroxy-1-propanesulfonic acid; 2-Amino-2-methyl-1-propanol; 3-(Cyclohexylamino)-1-propanesulfonic acid; Potassium dihydrogen phosphate and NaOH; Tris(hydroxymethyl)aminomethane and HCl; Borax and HCl; Borax and NaOH; Sodium bicarbonate and NaOH; Disodium hydrogen phosphate and NaOH; KCl and NaOH; or a combination thereof. Some embodiments may use any variety of concentration of a buffer, from dilute solutions of buffer (0.1% solution) to a buffer concentrate.

Water may be used to help dissolve and remove highly soluble portion of PLA from the crude sample. The low molecular weight species, and PLA polymer with more than 7% "dextro" component go into solution quickly. Hence, water washing may be sufficient to remove the species that lowers the pH of the treatment fluid. Washing may include exposing the crude polyacid and/or polyacid derivative to a volume of aqueous solution and removing aqueous solution. In some embodiments, the washing is performed more than once. In some embodiments, the aqueous solution washing includes exposing the crude polyacid and/or polyacid derivative to a volume of aqueous solution and removing water and species comprising optically active isomers comprising more than 7% D-form of the crude polyacid and/or polyacid derivative.

In some embodiments, the organic acid may be delivered as part of a slurry, powder, dry particulates, in water, in an organic medium, with a polymer, and/or as a single additive. In some embodiments, the organic acid may be present as a solid particle. The particle may have a variety of shapes that are selected for a variety of purposes. The solid acid-precursors may be manufactured in various solid shapes, including, but not limited to fibers, beads, films, ribbons and platelets. The solid acid-precursors may be coated to slow the hydrolysis. Suitable coatings include polycaprolate (a copolymer of glycolide and epsilon-caprolactone), and calcium stearate, both of which are hydrophobic. Polycaprolate itself slowly hydrolyzes. Generating a hydrophobic layer on the surface of the solid acid-precursors by any means delays the hydrolysis. Note that coating here may refer to encapsulation or simply to changing the surface by chemical reaction or by forming or adding a thin film of another material.

In some embodiments, the viscosity may be tailored such that the viscosity of the treatment fluid is about 15 cP at 40 s-1 or more at ambient conditions. Fluids may also include a viscosifier that may be a polymer that is either crosslinked or linear, a viscoelastic surfactant, or any combination thereof. In some embodiments, the viscosity control agent is guar, chemically modified guar, hydroxy ethyl cellulose, derivatised hydroxy ethyl cellulose, xantham gum, biopolymer, chitosan, diutan, starch, chemically modified starch, cationic polymer, ionic polymer, hydrophobically modified polymer, or a combination thereof. Some nonlimiting examples of suitable polymers include guar gums, high-molecular weight polysaccharides composed of mannose and galactose sugars, or guar derivatives such as hydroxypropyl guar (HPG), carboxymethyl guar (CMG), and carboxymethylhydroxypropyl guar (CMHPG). Cellulose derivatives such as hydroxyethylcellulose (HEC) or hydroxypropylcellulose (HPC) and carboxymethylhydroxyethylcellulose (CMHEC) may also be used. Any useful polymer may be used in either crosslinked form, or without crosslinker in linear form. Xanthan, diutan, and scleroglucan, three biopolymers, have been shown to be useful as viscosifying agents. In some embodiments, the viscosity control agent is in the form of a solid, a slurry, a solution, an emulsion, a colloid, or a combination thereof.

Synthetic polymers such as, but not limited to, polyacrylamide and polyacrylate polymers and copolymers are used typically for high-temperature applications. Nonlimiting examples of suitable viscoelastic surfactants useful for viscosifying some fluids include cationic surfactants, anionic surfactants, zwitterionic surfactants, amphoteric surfactants, nonionic surfactants, and combinations thereof. Also, associative polymers for which viscosity properties are enhanced by suitable surfactants and hydrophobically modified polymers can be used, such as cases where a charged polymer in the presence of a surfactant having a charge that is opposite to that of the charged polymer, the surfactant being capable of forming an ion-pair association with the polymer resulting in a hydrophobically modified polymer having a plurality of hydrophobic groups, as described in published application U.S. 20040209780A1, Harris, et. al.

In some method embodiments, the viscosifier is a water-dispersible, linear, nonionic, hydroxyalkyl galactomannan polymer or a substituted hydroxyalkyl galactomannan polymer. Examples of useful hydroxyalkyl galactomannan polymers include, but are not limited to, hydroxy-C1-C4-alkyl galactomannans, such as hydroxy-C1-C4-alkyl guars. Preferred examples of such hydroxyalkyl guars include hydroxyethyl guar (HE guar), hydroxypropyl guar (HP guar), and hydroxybutyl guar (HB guar), and mixed C2-C4, C2/C3, C3/C4, or C2/C4 hydroxyalkyl guars. Hydroxymethyl groups can also be present in any of these.

As used herein, substituted hydroxyalkyl galactomannan polymers are obtainable as substituted derivatives of the hydroxy-C1-C4-alkyl galactomannans, which include: 1) hydrophobically-modified hydroxyalkyl galactomannans, e.g., C1-C18-alkyl-substituted hydroxyalkyl galactomannans, e.g., wherein the amount of alkyl substituent groups is preferably about 2% by weight or less of the hydroxyalkyl galactomannan; and 2) poly(oxyalkylene)-grafted galactomannans (see, e.g., A. Bahamdan & W. H. Daly, in Proc. 8PthP Polymers for Adv. Technol. Int'l Symp. (Budapest, Hungary, September 2005) (PEG- and/or PPG-grafting is illustrated, although applied therein to carboxymethyl guar, rather than directly to a galactomannan)). Poly(oxyalkylene)-grafts thereof can comprise two or more than two oxyalkylene residues; and the oxyalkylene residues can be C1-C4 oxyalkylenes. Mixed-substitution polymers comprising alkyl substituent groups and poly(oxyalkylene) substituent groups on the hydroxyalkyl galactomannan are also useful herein. In various embodiments of substituted hydroxyalkyl galactomannans, the ratio of alkyl and/or poly(oxyalkylene) substituent groups to mannosyl backbone residues can be about 1:25 or less, i.e. with at least one substituent per hydroxyalkyl galactomannan molecule; the ratio can be: at least or about 1:2000, 1:500, 1:100, or 1:50; or up to or about 1:50, 1:40, 1:35, or 1:30. Combinations of galactomannan polymers according to the present disclosure can also be used.

As used herein, galactomannans comprise a polymannose backbone attached to galactose branches that are present at an average ratio of from 1:1 to 1:5 galactose branches:mannose residues. Preferred galactomannans comprise a 1→4-linked β-D-mannopyranose backbone that is 1→6-linked to α-D-galactopyranose branches. Galactose branches can comprise from 1 to about 5 galactosyl residues; in various embodiments, the average branch length can be from 1 to 2, or from 1 to about 1.5 residues. Preferred branches are monogalactosyl branches. In various embodiments, the ratio of galactose branches to backbone mannose residues can be, approximately, from 1:1 to 1:3, from 1:1.5 to 1:2.5, or from 1:1.5 to 1:2, on average. In various embodiments, the galactomannan can have a linear polymannose backbone. The galactomannan can be natural or synthetic. Natural galactomannans useful herein include plant and microbial (e.g., fungal) galactomannans, among which plant galactomannans are preferred. In various embodiments, legume seed galactomannans can be used, examples of which include, but are not limited to: tara gum (e.g., from *Cesalpinia spinosa* seeds) and guar gum (e.g., from *Cyamopsis tetragonoloba* seeds). In addition, although embodiments may be described or exemplified with reference to guar, such as by reference to hydroxy-C1-C4-alkyl guars, such descriptions apply equally to other galactomannans, as well.

When incorporated, the polymer based viscosifier may be present at any suitable concentration. In various embodiments hereof, the gelling agent can be present in an amount of from about 10 to less than about 60 pounds per thousand gallons of liquid phase, or from about 15 to less than about 40 pounds per thousand gallons, from about 15 to about 35 pounds per thousand gallons, 15 to about 25 pounds per thousand gallons, or even from about 17 to about 22 pounds per thousand gallons. Generally, the gelling agent can be present in an amount of from about 10 to less than about 50 pounds per thousand gallons of liquid phase, with a lower limit of polymer being no less than about 10, 11, 12, 13, 14, 15, 16, 17, 18, or 19 pounds per thousand gallons of the liquid phase, and the upper limited being less than about 50 pounds per thousand gallons, no greater than 59, 54, 49, 44, 39, 34, 30, 29, 28, 27, 26, 25, 24, 23, 22, 21, or 20 pounds per thousand gallons of the liquid phase. In some embodiments, the polymers can be present in an amount of about 20 pounds per thousand gallons. Hydroxypropyl guar, carboxymethyl hydroxypropyl guar, carboxymethyl guar, cationic functional guar, guar or mixtures thereof, are preferred polymers for use herein as a gelling agent. Fluids incorporating polymer based viscosifiers may have any suitable viscosity, preferably a viscosity value of the crosslinked gel about 50 mPa-s or greater at a shear rate of about 100 s-1 at treatment temperature, more preferably about 75 mPa-s or greater at a shear rate of about 100 s-1, and even more preferably about 100 mPa-s or greater.

In some embodiments, the treatment fluid is used for drilling, fracturing, stimulating, gravel packing, fluid loss control, lost circulation, cementing, perforating, diversion, coiled tubing, or clean-out applications. Some embodiments include exposing the treatment fluid to a surface of the subterranean formation and/or exposing the fluid to equipment or tubular positioned within the subterranean formation. In some embodiments, the treatment fluid further comprises a particulate. In some embodiments, the treatment fluid may be a foam or energized fluid.

In some embodiments, the treatment fluid is not crosslinked. In some embodiments, the fluid is crosslinked. In some embodiments, polysaccharides may be crosslinked with a suitable crosslinker. Adding crosslinkers to the fluid may further augment the viscosity of the fluid. Crosslinking consists of the attachment of two polymeric chains through the chemical association of such chains to a common element or chemical group. Suitable crosslinkers may comprise a chemical compound containing a polyvalent metal ion such as, but not necessarily limited to, chromium, iron, boron, aluminum, titanium, and zirconium. That is, crosslinkers may be selected to crosslink using borate ions, zirconium IV ions, titanium IV ions, aluminum ions, antimony ions, chromium ions, iron ions, copper ions, and zinc ions.

In some embodiments, the treatment fluid includes a crosslinker that is selected from the group consisting of boric acid, disodium octaborate tetrahydrate, sodium diborate and pentaborates, ulexite, colemanite, zirconium lactate, zirconium lactate triethanolamine, zirconium carbonate, zirconium acetylacetonate, zirconium diisoproplyamine lactate, titanium ammonium lactate, titanium triethanolamine, titanium acetylacetonate, aluminum citrate, aluminum lactate, metal or organo metal nano particulates, zirconium malate, zirconium citrate, zirconium glycolate, zirconium triethanol amine glycolate, zirconium lactate glycolate, titanium lactate, titanium malate, titanium citrate, antimony compounds, chromium compounds, iron compounds, copper compounds, zinc compounds, and combinations thereof.

Fluids may further contain other additives and chemicals that are known to be commonly used in oilfield applications by those skilled in the art. These include, but are not necessarily limited to, materials such as surfactants, breaker, buffers, oxygen scavengers, high temperature stabilizers, alcohols, scale inhibitors, corrosion inhibitors, other fluid-loss additives, bactericides, and the like. Also, they may include a co-surfactant to optimize viscosity or to minimize the formation of stable emulsions that contain components of crude oil or a polysaccharide or chemically modified polysaccharide, polymers such as cellulose, derivatized cellulose, guar gum, derivatized guar gum, xanthan gum, or synthetic polymers such as polyacrylamides and polyacrylamide copolymers, oxidizers such as ammonium persulfate and sodium bromate, and biocides such as 2,2-dibromo-3-nitrilopropionamine.

Embodiments may also include placing proppant particles or gravel that are substantially insoluble in the fluids of the formation. Particles carried by the treatment fluid remain in the fracture created, thus propping open the fracture when the fracturing pressure is released and the well is put into production. Any proppant (gravel) can be used, provided that it is compatible with the base and the bridging-promoting materials if the latter are used, the formation, the fluid, and the desired results of the treatment. Such proppants (gravels) can be natural or synthetic, coated, or contain chemicals; more than one can be used sequentially or in mixtures of different sizes or different materials. Proppants and gravels in the same or different wells or treatments can be the same material and/or the same size as one another and the term "proppant" is intended to include gravel in this discussion. Proppant is selected based on the rock strength, formation pressure, injection pressures, types of injection fluids, or even completion design. Preferably, the proppant materials include, but are not limited to, sand, sintered bauxite, glass beads, ceramic materials, other man made materials, naturally occurring materials, coated, impregnated and encapsulated naturally occurring materials, or similar materials. Mixtures of proppants can be used as well. Naturally occurring materials may be underived and/or unprocessed naturally occurring materials, as well as materials based on naturally occurring materials that have been processed and/or derived. Suitable examples of naturally occurring particulate materials for use as proppants include, but are not necessarily limited to: ground or crushed shells of nuts such as walnut, coconut, pecan, almond, ivory nut, brazil nut, etc.; ground or crushed seed shells (including fruit pits) of seeds of fruits such as plum, olive, peach, cherry, apricot, etc.; ground or crushed seed shells of other plants such as maize (e.g., corn cobs or corn kernels), etc.; processed wood materials such as those derived from woods such as oak, hickory, walnut, poplar, mahogany, etc., including such woods that have been processed by grinding, chipping, or other form of particalization, processing, etc, some nonlimiting examples of which are proppants supplied under the tradename LITEPROP™ available from BJ Services Co., made of walnut hulls impregnated and encapsulated with resins. Further information on some of the above-noted compositions thereof may be found in Encyclopedia of Chemical Technology, Edited by Raymond E. Kirk and Donald F. Othmer, Third Edition, John Wiley & Sons, Volume 16, pages 248-273 (entitled "Nuts"), Copyright 1981, which is incorporated herein by reference.

EXAMPLES

FIG. 1 is a plot of apparent viscosity as a function of time for four fluids of an embodiment of the invention. Experiments were performed on a HT/HP rheometer such as Fann 50 or Grace Rheo meter. FIG. 1 compares the viscosity as a function of time for four fluids, (1) a fluid with no fluid loss additive (FLA), (2) a fluid with an FLA that has not been prepared to a fluid loss additive with a controlled crystalline structure or molecular weight, (3) a fluid with an FLA with a controlled crystalline structure and molecular weight, and (4) a fluid with an FLA with a controlled crystalline structure and molecular weight in the presence of a breaker.

FIG. 1 illustrates that when the fluid loss additive has been prepared by removing the low molecular weight material and undesired crystalline structure material, the viscosity of the fluid is maintained for a longer period of time. FIG. 1 also illustrates that that a fluid loss additive is not pretreated for solubility selectively, it breaks the crosslinked fluid due to the lowering of pH, and hence the viscosity is much lower than if no fluid loss additive were present at all. Finally, FIG. 1 shows that the breaker is effective in the presence of fluid loss additive with a controlled crystalline structure and molecular weight. That is, a desirable time delay may be established and a predictable breaker schedule could be generated for designing the various stages of the fluids to be pumped. By preparing the PLA, we could eliminate the decrosslinking difficulties in the presence of PLA. After the fracturing treatment, the second phase of PLA hydrolysis releases acid in the polymer resulting in decrosslinking and molecular hydrolysis of the polymer structure and this attribute may be especially desirable in the better filtercake removal process.

Figure 2:
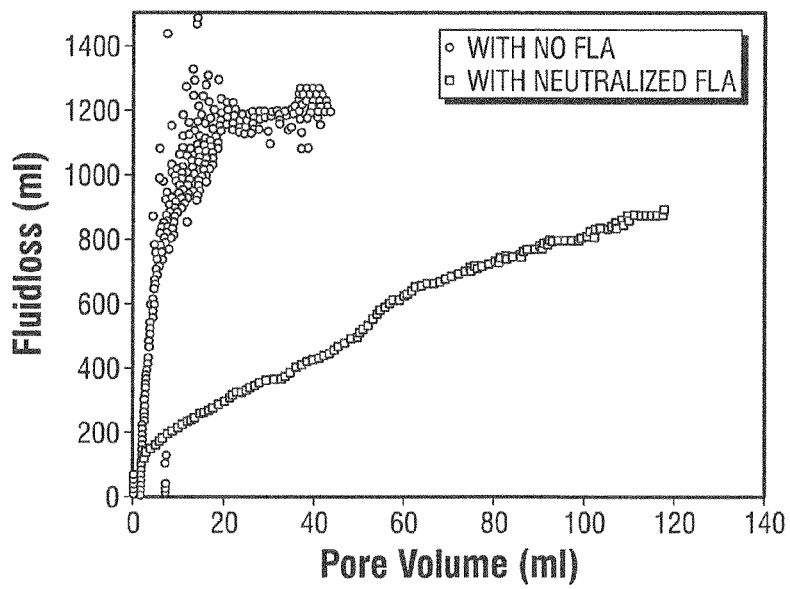
FIG. 2 is a plot of leakoff as a function of pore volume for two fluids of an embodiment of the invention.

FIG. 2 is a plot of leakoff as a function of pore volume for two fluids of an embodiment. The plot illustrates that the fluid containing a neutralized fluid loss additive has a more controlled leakoff over a wide range of pore volume compared to a fluid with no fluid loss additive or a fluid with a fluid loss additive that has not been tailored to have desired molecular weight or crystalline structure. Composition of a typical crosslinked fracturing fluid is outlined in Table 1.

TABLE 1

| Function | Concentration | Amount for 500 ml |
|---|---|---|
| Potassium Chloride | 168 lb/Mgal | 10 g |
| Microbiocide | 0.45 lb/Mgal | 0.027 g |
| HT gel stabilizer | 10 lb/Mgal | 0.6 g |
| surfactant | 1 gal/Mgal | 0.5 ml |
| Gelling agent | 40 lb/Mgal | 2.4 g |
| crosslinker | 7.5 lb/Mgal | 0.45 g |
| activator | 15 lb/Mgal | 0.9 g |
| stabilizer | 1 gal/Mgal | 0.5 ml |
| Crosslink delay agent | To be determined | To be determined |
| Encap-breaker | To be determined | To be determined |

In this study, the required concentration of washed or neutralized PLA/PGA was added to the mixture.

The experimental procedure below was followed to generate the data in FIG. 1.

Linear Gel Preparation:
Pour 490 ml water into the mixing cup. Stir with low speed.
Add 10 grams of KCl and 0.027 g of microbiocide into the mixing cup.
Add 2.4 g of gelling agent slowly into the cup and control the stir rate to allow the polymer dispersion.
Increase the stir rate after polymer dispersion to get faster hydration.
Hydrate the gel for 30-60 minutes.
Check the fluid temperature and pH (should be 6-8).
Check the fluid viscosity to see if it is in the specified range.
During the gel hydration, weigh 0.6 g of high temperature gel stabilizer, dissolve it using small amount of water.
Crosslinker Preparation:
Add 3.7 ml of water into a glass bottle. Start stirring using magnetic stirrer.
Weigh 0.9 g of activator and add slowly into the bottle while stirring.
Measure 0.45 g of crosslinker, add it into the bottle while stirring.
Add the required amount of crosslink delay agent slowly for dissolving. Place 0.5 ml of stabilizer into the bottle after crosslink delay agent dissolving.
Age the crosslinker solution for 60 minutes.
Gel Crosslinking:
Adjust the stirring speed to create a vortex to the tip of the stirrer.
Add high temperature gel stabilizer solution and 0.5 ml of surfactant into the mixing cup to mix one more minute.
Add the prepared crosslinker into the linear gel while start timing.
Record the time to reach the vortex closure. (Vortex Closure Time)
Check the time until hang-lip happens. (Hang-Lip Time)
Check the pH of the X-linked gel.
Rheology Test Procedures (Fann 50 or Grace Rheometer)
Prepare the base gel as described in different fluid preparation procedures.
Place amount of breaker solution When using the encapsulated breaker, it is added to the crosslinked fluid in the Fann cup.
X-link the gel as described procedures in according fluid preparation procedures.
Preheat the heating jacket to the required BHST.
Place the X-linked gel into the HT bottle with finger-tight cap and put them into the HTHP fluid loss cell containing proper amount of oil whose level is right below the bottle cap connection to avoid oil getting into the bottle and contaminate the fluid. Keep the whole cell assembly straight during above operation.
Place the HTHP cell assembly with bottle/oil heating medium into the heating jacket
Start timing while HTHP cell temperature reaches the BHT.
Visually observe the viscosity of the fluid after cooling down the cell and taking out the cup after the expected breaking time.
Fluidloss Test Procedure (HP-HT Fluidloss Cell)
A ceramic filter disk is placed in a HP-HT Fluidloss Cell
The fluid to be tested (fracturing fluid with no FLA or the same fluid contained the prepared PLA) is taken in the cell and a typical fluidloss test is performed
The fluidloss is monitored over a period of time.
FIG. 2 shows the result of the fluidloss experiment when the two crosslinked fracturing fluids were used. When the system does not have FLA, the leakoff is very high and will lead to poor fluid efficiency and failure of the treatment. When the prepared PLA is used with the crosslinked fracturing fluid, the rheology in maintained (FIG. 1) and the fluidloss of the system is substantially reduced (FIG. 2).

Figure 3:
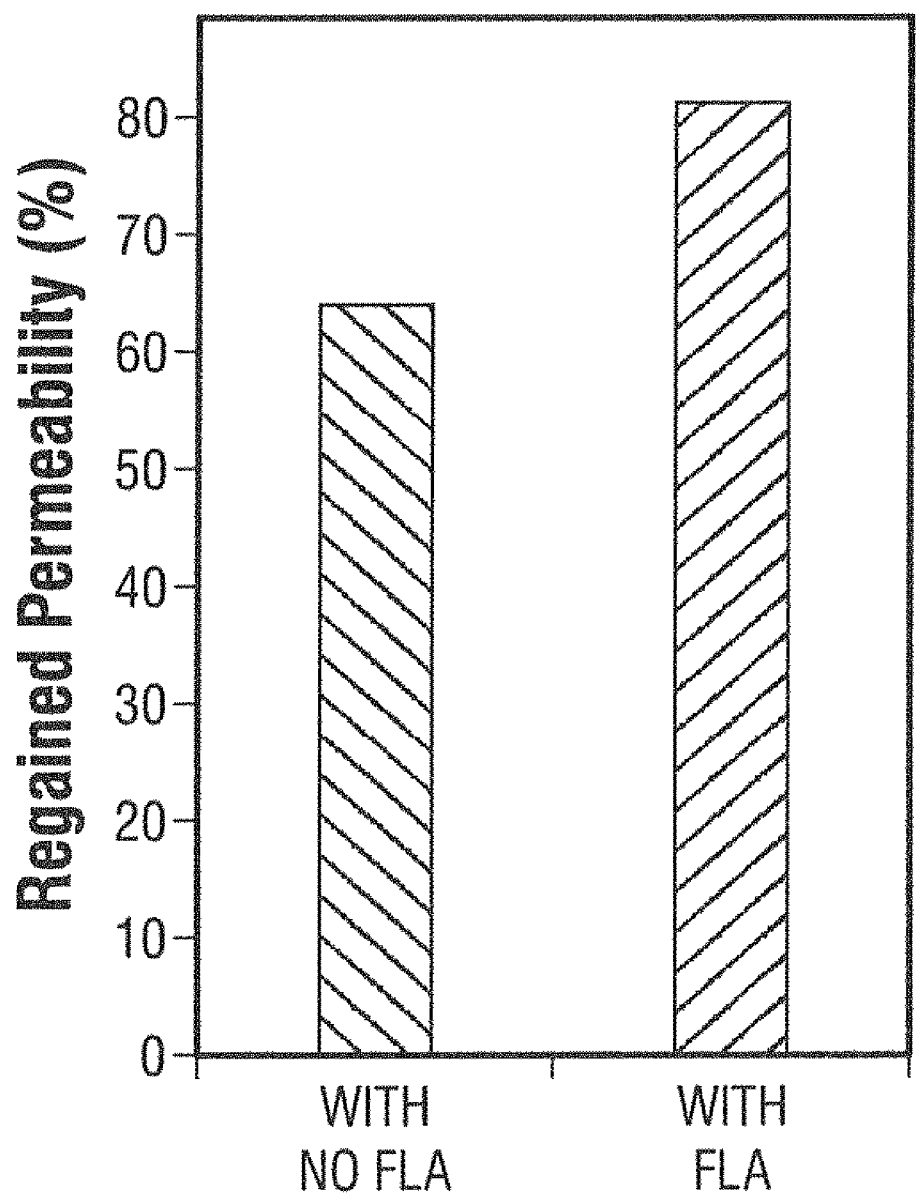
FIG. 3 is a bar chart comparing regained permeability as a function of the presence of a fluid loss additive for an embodiment of the invention.

FIG. 3 is a bar chart comparing regained permeability as a function of the presence of a fluid loss additive for an embodiment of the invention. FIG. 3 shows that the regained permeability of a fluid with the fluid loss additive that is tailored for its molecular weight and crystalline structure is higher than for a fluid with no fluid loss additive. That is, over time, the fluid loss additive can degrade and produce a week acid that could break the polymer structure. This will allow better cleanup, and higher regained permeability and better production for the well.

In another example, rheology of a borate crosslinked guar based fluid containing polylactic acid was treated with and without sodium bicarbonate-sodium carbonate buffer, as well as no polylactic acid fluid loss additive (FLA). Results (FIG. 1) indicated the fluid viscosity decreased prematurely when the PLA was not treated with the buffer. Further, the study was conducted on a sample containing FLA, sodium bicarbonate-sodium carbonate mixture, and an oxidizing breaker. The fluid formulations are in Table 2.

TABLE 2

| Additive Description | Crosslinked Frac Fluid | Crosslinked Frac Fluid with Neutralized FLA |
|---|---|---|
| Potassium Chloride | 166.7 ppt | 166.7 ppt |
| Biocide | 0.6 gpt | 0.6 gpt |
| Defoamer | 0.2 gpt | 0.2 gpt |
| Surfactant | 2.0 gpt | 2.0 gpt |
| Guar slurry | 9.0 gpt | 9.0 gpt |
| Crosslinker | 15 ppt | 15 ppt |
| Caustic | 30 gpt | 30 gpt |
| Delay additive | 40 ppt | 40 ppt |
| Buffer | 0 | 50 ppt |
| FLA | 0 | 60 ppt |
| Breaker | 0 to 10 ppt when needed | |

Fluid loss properties, wall building Coefficient (Cw) and spurt (Sp) were evaluated using fracturing fluids with and without the buffer treated PLA fluid loss additive at two different temperatures and permeabilities. The spurt loss was improved even at 2,000 mD, as shown in table 3:

TABLE 3

| Fluid System | Core Permeability (mD) | Leakoff Coefficient Cw (ft/sq rt min) | Spurt Loss SP (gal/100 ft 2) | Temp (deg F.) |
|---|---|---|---|---|
| Fractruring Fluid Alone | 335 | 0.0023 | 11.11 | 225 |
| Frac fluid + neutralized FLA | 335 | 0.00186 | 8.13 | 225 |
| Fractruring Fluid Alone | 2,000 | 0.0024 | 48.96 | 190 |
| Frac fluid + neutralized FLA | 2,000 | 0.00206 | 37.16 | 190 |

The cleanup data on a core flow experiment shows quicker and better cleanup, and regained permeability in the presence of the fluid loss additive pretreated with the buffer for the removal/partial neutralization of the PLA selective species. This conductivity data was obtained by conventional core testing methods, such as those outlined in API RP 61: "Recommended Practices for Evaluating Short Term Proppant Pack Conductivity," $1^{st}$ Ed. American Petroleum Institute, Washington, D.C. (October 1989).

The particular embodiments disclosed above are illustrative only, as the invention may be modified and practiced in different but equivalent manners apparent to those skilled in the art having the benefit of the teachings herein. Furthermore, no limitations are intended to the details herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A method for forming and utilizing a fluid for treating a subterranean formation, the method comprising:
   exposing a crude polyacid and/or polyacid derivative to a preparation method, wherein the crude polyacid and/or polyacid derivative is selected from the group consisting of lactides; poly(lactides); glycolides; poly(glycolides); and combinations thereof;
   admixing the prepared polyacid and/or polyacid derivative with a fluid to form a treatment fluid; and,
   contacting a subterranean formation and/or a wellbore with the treatment fluid;
   wherein the viscosity of the treatment fluid is not observably reduced by admixing the prepared polyacid and/or polyacid derivative with the treatment fluid.

2. The method of claim 1, wherein the preparation method comprises at least one of washing with an aqueous solution, combining with a buffer, introducing a material to tailor the pH of the crude polyacid or polyacid derivative.

3. The method of claim 2, wherein the preparation method comprises washing with an aqueous solution, wherein the aqueous solution washing comprises exposing the crude polyacid and/or polyacid derivative to a volume of aqueous solution and at least partially removing the aqueous solution and the crude polyacid and/or polyacid derivative with lower molecular weight than the prepared polyacid and/or polyacid derivative.

4. The method of claim 3, wherein the aqueous solution is water, brine, a solution comprising an acid soluble material, or a combination thereof.

5. The method of claim 3, wherein the washing is performed more than once.

6. The method of claim 2, wherein the preparation method comprises washing with an aqueous solution, wherein the aqueous solution washing comprises exposing the crude polyacid and/or polyacid derivative to a volume of aqueous solution and removing water and species comprising optically active isomers comprising more than 7% D-form of the crude polyacid and/or polyacid derivative.

7. The method of claim 2, wherein the preparation method comprises combining with a buffer, wherein the buffer comprises a base and a salt of the base with an acid.

8. The method of claim 2, wherein the preparation method comprises combining with a buffer, wherein the buffer comprises an amine and a halide; a weak acid and a salt; and/or an organic buffer.

9. The method of claim 2, wherein the preparation method comprises combining with a buffer, wherein the buffer comprises tris-glycine; sodium carbonate and sodium bicarbonate; potassium carbonate and potassium bicarbonate; phosphate and metaphosphate; $NH_4OH+NH_4Cl$; $C_2H_5$—$NH_2$+ $C_2H_5NH_3^+Cl^-$; N-(2-Acetamido)-2-iminodiacetic acid; 2-[(2Amino-2-oxoethyl)amino]ethanesulfonic acid; Piperazine-N,N'-bis(2-ethanesulfonic acid); 3-(N-Morpholino)-2-hydroxypropanesulfonic acid; 1,3-Bis[tris (hydroxymethyl)methylamino]propane;

N,N-Bis(2-hydroxyethyl)-2-aminoethanesulfonic acid; 3-(N-Morpholino)propanesulfonic acid; N-(2-Hydroxyethyl)piperazine-N'-(2-ethanesulfonic acid);
N-Tris(hydroxymethyl)methyl-2-aminoethanesulfonic acid;
3-[N,N-Bis(2-hydroxyethyl)amino]-2-hydroxypropanesulfonic acid;
3-[N-Tris(hydroxymethyl)methylamino)-2-hydroxypropanesulfonic acid;
Tris(hydroxymethyl)aminomethane;
N-(2-hydroxyethyl)piperazine-N'-(2-hydroxypropanesulfonic acid);
Piperazine-N,N'-bis(2-hydroxypropanesulfonic acid);
N-(2-Hydroxyethyl)piperazine-N'-(3-propanesulfonic acid); Triethanolamine;
N-Tris(hydroxymethyl)methylglycine; N,N-Bis(2-hydroxyethyl)glycine;
N-Tris(hydroxymethyl)methyl-3-aminopropanesulfonic acid;
3-[(1,1-Dimethyl-2-hydroxyethyl)amino]-2-hydroxypropanesulfonic acid;
2-(N-Cyclohexylamino)ethanesulfonic acid;
3-(Cyclohexylamino)-2-hydroxy-1-propanesulfonic acid;
2-Amino-2-methyl-1-propanol; 3-(Cyclohexylamino)-1-propanesulfonic acid; Potassium dihydrogen phosphate and NaOH; Tris(hydroxymethyl)aminomethane and HCl; Borax and HCl; Borax and NaOH; Sodium bicarbonate and NaOH; Disodium hydrogen phosphate and NaOH; KCl and NaOH; or a combination thereof.

10. The method of claim 2, wherein the preparation method comprises introducing a material to tailor the pH of the crude polyacid or polyacid derivative wherein the pH is about 5 to about 11.

11. The method of claim 1 wherein the treatment fluid is crosslinked.

12. The method in claim 11 wherein the treatment fluid further comprises a crosslinker that is selected from the group consisting of boric acid, disodium octaborate tetrahydrate, sodium diborate and pentaborates, ulexite, colemanite, zirconium lactate, zirconium lactate triethanolamine, zirconium carbonate, zirconium acetylacetonate, zirconium diisoproplyamine lactate, titanium ammonium lactate, titanium triethanolamine, titanium acetylacetonate, aluminum citrate, aluminum lactate, metal or organo metal nano particulates, zirconium malate, zirconium citrate, zirconium glycolate, zirconium triethanol amine glycolate, zirconium lactate glycolate, titanium lactate, titanium maleate, titanium citrate, antimony compounds, chromium compounds, iron compounds, copper compounds, zinc compounds, and combinations thereof.

13. The method of claim 1, wherein the treatment fluid has a pH of about 7 or higher.

14. The method of claim 1 wherein the treatment fluid is not crosslinked.

15. The method of claim 1, wherein the viscosity at ambient conditions of the treatment fluid is at least about 15 mPa-s at 40 s$^{-1}$.

16. The method of claim 1, wherein the contacting is in a process selected from drilling, fracturing, stimulating, gravel packing, fluid loss control, lost circulation control, cementing, perforating, diversion, coiled tubing deployment, or clean-out applications.

17. The method of claim 1, wherein the crude polyacid and/or polyacid derivative has a maximum solubility of about 30 percent at ambient conditions.

18. The method of claim 1, further comprising exposing the treatment fluid to a surface of the subterranean formation.

19. The method of claim 1, further comprising exposing the fluid to equipment or tubular positioned within the subterranean formation.

20. The method of claim 1, wherein the treatment fluid further comprises a particulate.

21. The method of claim 1, wherein the prepared polyacid and/or polyacid derivative is about 70 percent by weight or more of the crude polyacid and/or polyacid derivative used.

22. The method of claim 1, wherein the prepared polyacid and/or polyacid derivative is about 90 percent by weight or more of the crude polyacid and/or polyacid derivative used.

23. The method of claim 1, wherein the treatment fluid is a foam or energized fluid.

24. The method of claim 1, wherein the preparation method comprises contacting the crude polyacid and/or polyacid derivative with a caustic material.

25. A composition for use in the oil field services industry, comprising:
a prepared polyacid and/or polyacid derivative, wherein the prepared polyacid and/or polyacid derivative is selected from the group consisting of lactides; poly(lactides); glycolides; poly(glycolides); and combinations thereof;
a fluid; and
a viscosity control agent, wherein the viscosity of the composition is not observably lower when exposed to the prepared polyacid and/or polyacid derivative.

26. The composition of the claim 25, wherein the prepared polyacid and/or polyacid derivative has a maximum solubility of about 30 percent at ambient conditions.

27. The composition of claim 25, wherein the prepared polyacid and/or polyacid derivative is about 85 percent by weight or more of a crude polyacid and/or polyacid derivative in the treatment fluid.

28. The composition of claim 25, wherein the viscosity control agent is in the form of a solid, a powder, a slurry, a solution, an emulsion, a colloid, or a combination thereof.

29. The composition of claim 25, wherein the viscosity control agent is guar, chemically modified guar, hydroxy ethyl cellulose, derivatised hydroxy ethyl cellulose, xanthan gum, biopolymer, chitosan, diutan, starch, chemically modified starch, cationic polymer, micropolymer, ionic polymer, hydrophobically modified polymer, or a combination thereof.

30. A method for forming and utilizing a fluid for treating a subterranean formation, the method comprising:
exposing a crude polyacid and/or polyacid derivative to a preparation method, wherein the preparation method comprises at least one of: washing with an aqueous solution more than once, wherein the aqueous solution washing comprises exposing the crude polyacid and/or polyacid derivative to a volume of aqueous solution and at least partially removing the aqueous solution and the crude polyacid and/or polyacid derivative with lower molecular weight than the prepared polyacid and/or polyacid derivative; and contacting the crude polyacid and/or polyacid derivative with a caustic material;
admixing the prepared polyacid and/or polyacid derivative with a fluid to form a treatment fluid; and,
contacting a subterranean formation and/or a wellbore with the treatment fluid;
wherein the viscosity of the treatment fluid is not observably reduced by admixing the prepared polyacid and/or polyacid derivative with the treatment fluid.

31. The method of claim 30, wherein the crude polyacid and/or polyacid derivative is selected from the group consisting of lactides; poly(lactides); lactones; glycolides; poly(glycolides); copoly(glycolide); esters; ortho ethers; poly (ortho ethers); substantially water-insoluble anhydrides; poly(anhydrides); amino acids; amino acid polymers; nitro or sulfonate or carboxy or carboxyl acid functionally modified nanoparticles and/or nanopolymers; poly acrylic acid; aliphatic polyesters, poly($\epsilon$-caprolactones); poly(hydroxy ester ethers); poly(hydroxybutyrates); polycarbonates; poly(orthoesters); poly(ethylene oxides); poly(phosphazenes); poly(hydroxybutyrates); poly ether esters; polyester amides; polyamides; polycarboxy polymer; composites of poly acids with other natural or synthetic materials; derivatives thereof; polymers thereof; copolymers thereof; and combinations thereof.

32. A method for forming and utilizing a fluid for treating a subterranean formation, the method comprising:

exposing a crude polyacid and/or polyacid derivative to a preparation method;

admixing the prepared polyacid and/or polyacid derivative with a fluid to form a treatment fluid; and, contacting a subterranean formation and/or a wellbore with the treatment fluid;

wherein the viscosity of the treatment fluid is not observably reduced by admixing the prepared polyacid and/or polyacid derivative with the treatment fluid;

wherein the treatment fluid is crosslinked, further comprises a particulate or is a foam or energized fluid.

33. The method of claim 32, wherein the crude polyacid and/or polyacid derivative is selected from the group consisting of lactides; poly(lactides); lactones; glycolides; poly(glycolides); copoly(glycolide); esters; ortho ethers; poly(ortho ethers); substantially water-insoluble anhydrides; poly(anhydrides); amino acids; amino acid polymers; nitro or sulfonate or carboxy or carboxyl acid functionally modified nanoparticles and/or nanopolymers; poly acrylic acid; aliphatic polyesters, poly($\epsilon$-caprolactones); poly(hydroxy ester ethers); poly(hydroxybutyrates); polycarbonates; poly(orthoesters); poly(ethylene oxides); poly(phosphazenes); poly(hydroxybutyrates); poly ether esters; polyester amides; polyamides; polycarboxy polymer; composites of poly acids with other natural or synthetic materials; derivatives thereof; polymers thereof; copolymers thereof; and combinations thereof.

* * * * *